US012282882B2

(12) United States Patent
Shcherbinin et al.

(10) Patent No.: US 12,282,882 B2
(45) Date of Patent: Apr. 22, 2025

(54) CUSTOMER CONTACT MANAGEMENT IN ASSOCIATION WITH PROVISIONING PRODUCTS THROUGH A PROVIDER NETWORK OF AN ENTERPRISE

(71) Applicant: Align Technology, Inc., San Jose, CA (US)

(72) Inventors: Vladislav Shcherbinin, Moscow (RU); Kirill Savin, Raleigh, NC (US); Anna Akopova, Moscow (RU); Arev Hambardzumyan, Moscow (RU); Arseniy Korsun, Kostroma (RU)

(73) Assignee: Align Technology, Inc., San Jose, CA (US)

( * ) Notice: Subject to any disclaimer, the term of this patent is extended or adjusted under 35 U.S.C. 154(b) by 113 days.

(21) Appl. No.: 18/078,872

(22) Filed: Dec. 9, 2022

(65) Prior Publication Data

US 2023/0206161 A1   Jun. 29, 2023

Related U.S. Application Data

(60) Provisional application No. 63/289,021, filed on Dec. 13, 2021.

(51) Int. Cl.
*G06Q 10/00* (2023.01)
*G06Q 10/0637* (2023.01)
*G06Q 10/067* (2023.01)

(52) U.S. Cl.
CPC ....... *G06Q 10/067* (2013.01); *G06Q 10/0637* (2013.01)

(58) Field of Classification Search
None
See application file for complete search history.

(56) References Cited

U.S. PATENT DOCUMENTS 7,001,270 B2   2/2006   Taub
7,383,198 B1   6/2008   Sepe
(Continued)

OTHER PUBLICATIONS

Sutton, Richard, Reinforcement Learning Agents, 2019, MathWorks, https://www.mathworks.com/help/reinforcement-learning/ug/create-agents-for-reinforcement-learning.html, p. 1-6. (Year: 2019).*

(Continued)

*Primary Examiner* — Joseph M Waesco
(74) *Attorney, Agent, or Firm* — Lowenstein Sandler LLP

(57) ABSTRACT

Systems, methods, and computer-readable media for managing customer contact based on context. Specifically, a provider in a provider network associated with provisioning a specific product to a specific user can be identified. Context information related to the provider provisioning one or more products in relation to one or more workflows for provisioning the one or more products through the provider network can be accessed. A model can be applied based on the context information to identify circumstances associated with a likelihood that the provider will contact an enterprise of the provider network with respect to provisioning of the specific product to the specific user. As follows, performance of one or more remedial actions through the enterprise to address the provider contacting the enterprise can be facilitated based on the circumstances associated with the likelihood that the provider will contact the enterprise of the provider network.

30 Claims, 10 Drawing Sheets

(56) References Cited

U.S. PATENT DOCUMENTS

| | | | |
|---|---|---|---|
| 7,580,846 B2 | 8/2009 | Chishti et al. | |
| 7,870,280 B2 | 1/2011 | Kuo | |
| 7,904,307 B2 | 3/2011 | Abolfathi et al. | |
| 7,987,099 B2 | 7/2011 | Kuo et al. | |
| 8,024,198 B2 | 9/2011 | Kuo | |
| 8,615,473 B2 | 12/2013 | Spiegel et al. | |
| 8,738,394 B2 | 5/2014 | Kuo | |
| 10,467,815 B2 | 11/2019 | Marom et al. | |
| 10,504,386 B2 | 12/2019 | Levin et al. | |
| 10,595,966 B2 | 3/2020 | Carrier, Jr. et al. | |
| 10,695,150 B2 | 6/2020 | Kopelman et al. | |
| 10,885,521 B2 | 1/2021 | Miller et al. | |
| 10,888,399 B2 | 1/2021 | Kopelman et al. | |
| 10,980,612 B2 | 4/2021 | Jang | |
| 10,980,613 B2 | 4/2021 | Shanjani et al. | |
| 2002/0188478 A1 | 12/2002 | Breeland et al. | |
| 2005/0159986 A1 | 7/2005 | Breeland et al. | |
| 2008/0288289 A1 | 11/2008 | Sah | |
| 2016/0036981 A1* | 2/2016 | Hollenberg | H04M 3/5233 379/265.12 |
| 2016/0036983 A1* | 2/2016 | Korolev | H04M 3/5233 379/265.12 |
| 2018/0109680 A1* | 4/2018 | Korolev | H04M 3/5233 |
| 2020/0160947 A1 | 5/2020 | Rasovsky et al. | |
| 2020/0349133 A1* | 11/2020 | Dwarampudi | G06F 16/1734 |
| 2022/0114594 A1* | 4/2022 | Nunes | G06Q 20/4016 |
| 2022/0116415 A1* | 4/2022 | Burgis | H04L 67/51 |
| 2022/0147388 A1* | 5/2022 | Mundra | G06F 21/53 |
| 2022/0318711 A1* | 10/2022 | Recasens | G06Q 10/06315 |
| 2022/0383218 A1* | 12/2022 | Ison | G06Q 10/0639 |
| 2023/0011628 A1* | 1/2023 | Hurley | G06F 9/5072 |
| 2023/0050135 A1* | 2/2023 | Thiel | G06Q 10/0637 |

OTHER PUBLICATIONS

Lomas, N. "Amazon Patents "Anticipatory" Shipping—To Start Sending Stuff Before You've Bought It"; Tech Crunch, Jan. 18, 2014, 4 pages, available online at https://techcrunch.com/2014/01/18/amazon-pre-ships/.

* cited by examiner

FIG. 4

CUSTOMER CONTACT MANAGEMENT IN ASSOCIATION WITH PROVISIONING PRODUCTS THROUGH A PROVIDER NETWORK OF AN ENTERPRISE

RELATED APPLICATIONS

The present application claims the benefit under 35 U.S.C. § 119(e) of U.S. Provisional Patent Application No. 63/289,021 filed Dec. 13, 2021, which is incorporated by reference herein.

TECHNICAL FIELD

The present technology pertains to customer contact management based on context and in particular to managing enterprise contact with a product provider based on anticipated circumstances associated with contact by the product provider that are identified based on contexts associated with providers provisioning products.

BACKGROUND

Maintaining quality relationships with customers is vitally important to enterprise product providers. In particular, it is important that enterprise product providers maintain quality relationships with the individuals who provide the products to users and thereby act as customers to the enterprise product providers. For example, it is important that suppliers of dental products and services maintain quality relationships with the dentists, e.g. orthodontists, who provision the products and services to patients.

Central to maintaining quality relationships with product providers is providing superior customer service to the providers throughout various stages of workflows associated with provisioning products through the providers. Such customer service can include engaging in interactions with the providers to address their questions, comments, and concerns during the various stages of the workflows. For example, it is important during a workflow for creating dental aligners for a patient through an orthodontist, that the interactions with the orthodontist are sufficiently addressed. However, as the workflows associated with provisioning products become more and more complex, it becomes difficult for an enterprise to sufficiently address communications with product providers.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 is a screenshot of an example interface for facilitating performance of remedial actions based on predicted circumstances associated with a likelihood that a provider will contact an enterprise product provider, in accordance with some examples.

DESCRIPTION OF EXAMPLE EMBODIMENTS

Figure 1:
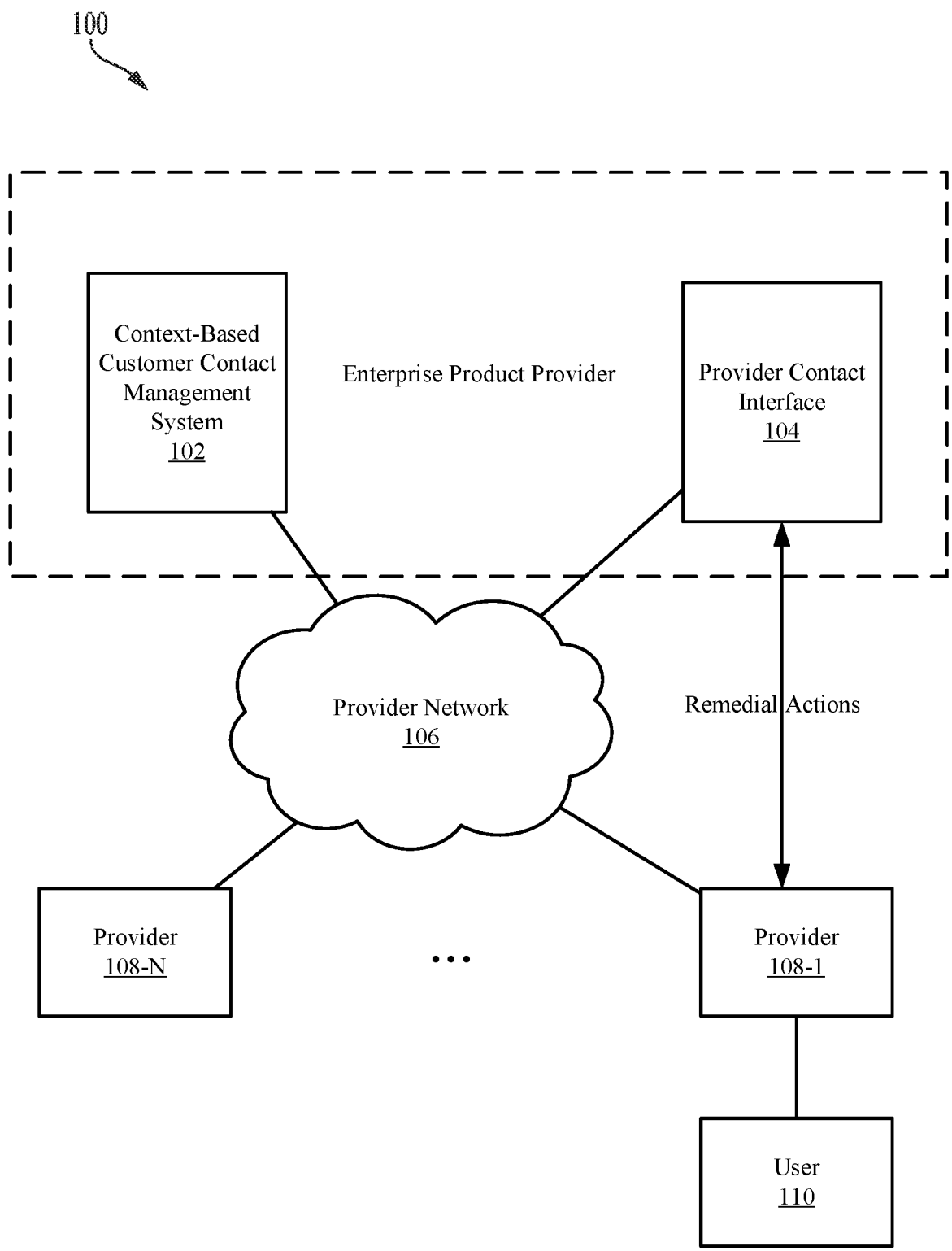
FIG. 1 illustrates an example environment for managing enterprise contact with a product provider based on context information associated with providers provisioning products, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include identifying a provider in a provider network associated with provisioning a specific product to a specific user. Context information related to the provider provisioning one or more products in relation to one or more workflows for provisioning the one or more products through the provider network can be accessed. A model can be applied based on the context information to identify circumstances associated with a likelihood that the provider will contact an enterprise of the provider network with respect to provisioning of the specific product to the specific user. As follows, performance of one or more remedial actions through the enterprise to address the provider contacting the enterprise can be facilitated based on the circumstances associated with the likelihood that the provider will contact the enterprise of the provider network.

A system can include one or more processors and at least one computer-readable storage medium storing instructions which, when executed by the one or more processors, cause the one or more processors to identify a provider in a provider network associated with provisioning a specific product to a specific user. The instructions can also cause the one or more processors to access context information related to the provider provisioning one or more products in relation to one or more workflows for provisioning the one or more products through the provider network. Further, the instructions can cause the one or more processors to apply a model based on the context information to identify circumstances associated with a likelihood that the provider will contact an enterprise of the provider network with respect to provisioning of the specific product to the specific user. As follows, the instructions can cause the one or more processors to facilitate, based on the circumstances associated with the likelihood that the provider will contact the enterprise of the provider network, performance of one or more remedial actions through the enterprise to address the provider contacting the enterprise.

A non-transitory computer-readable storage medium having stored therein instructions which, when executed by one or more processors, cause the one or more processors to identify a provider in a provider network associated with provisioning a specific product to a specific user. The instructions can also cause the one or more processors to access context information related to the provider provisioning one or more products in relation to one or more workflows for provisioning the one or more products through the provider network. Further, the instructions can cause the one or more processors to apply a model based on the context information to identify circumstances associated with a likelihood that the provider will contact an enterprise of the provider network with respect to provisioning of the specific product to the specific user. As follows, the instructions can cause the one or more processors to facilitate, based on the circumstances associated with the likelihood that the provider will contact the enterprise of the provider network, performance of one or more remedial actions through the enterprise to address the provider contacting the enterprise.

A method can include identifying a dental care provider in a dental care provider network associated with provisioning a specific dental product to a specific user. Context information related to the dental care provider provisioning one or more dental products in relation to one or more dental product workflows for provisioning the one or more dental products through the dental care provider network can be accessed. A model can be applied based on the context information to identify circumstances associated with a likelihood that the dental care provider will contact a dental product supplier of the dental care provider network with respect to provisioning of the specific dental product to the specific user. As follows, performance of one or more remedial actions through the dental product supplier to address the dental care provider contacting the dental product supplier can be facilitated based on the circumstances associated with the likelihood that the dental care provider will contact the dental product supplier of the dental care provider network.

A system can include one or more processors and at least one computer-readable storage medium storing instructions which, when executed by the one or more processors, cause the one or more processors to identify a dental care provider in a dental care provider network associated with provisioning a specific dental product to a specific user. The instructions can also cause the one or more processors to access context information related to the dental care provider provisioning one or more dental products in relation to one or more dental product workflows for provisioning the one or more dental products through the dental care provider network. Further, the instructions can cause the one or more processors to apply a model based on the context information to identify circumstances associated with a likelihood that the dental care provider will contact a dental product supplier of the dental care provider network with respect to provisioning of the specific dental product to the specific user. As follows, the instructions can cause the one or more processors to facilitate, based on the circumstances associated with the likelihood that the dental care provider will contact the dental product supplier of the dental care provider network, performance of one or more remedial actions through the dental product supplier to address the dental care provider contacting the dental product supplier.

A non-transitory computer-readable storage medium having stored therein instructions which, when executed by one or more processors, cause the one or more processors to identify a dental care provider in a dental care provider network associated with provisioning a specific dental product to a specific user. The instructions can also cause the one or more processors to access context information related to the dental care provider provisioning one or more dental products in relation to one or more dental product workflows for provisioning the one or more dental products through the dental care provider network. Further, the instructions can cause the one or more processors to apply a model based on the context information to identify circumstances associated with a likelihood that the dental care provider will contact a dental product supplier of the dental care provider network with respect to provisioning of the specific dental product to the specific user. As follows, the instructions can cause the one or more processors to facilitate, based on the circumstances associated with the likelihood that the dental care provider will contact the dental product supplier of the dental care provider network, performance of one or more remedial actions through the dental product supplier to address the dental care provider contacting the dental product supplier.

A method can include accessing context information related to one or more providers provisioning one or more products in relation to one or more workflows for provisioning the one or more products through a provider network. The context information can be separated into a plurality of subsets of context information. A model can be trained, at least in part, based on a first subset of the context information of the plurality of subsets of context information. Additionally, access to the model for identifying circumstances associated with a likelihood that a provider of the one or more providers will contact an enterprise of the provider network with respect to provisioning a specific product to a specific user can be facilitated.

A system can include one or more processors and at least one computer-readable storage medium storing instructions which, when executed by the one or more processors, cause the one or more processors to access context information related to one or more providers provisioning one or more products in relation to one or more workflows for provisioning the one or more products through a provider network. The instructions can also cause the one or more processors to separate the context information into a plurality of subsets of context information. Further, the instructions can cause the one or more processors to train a model based, at least in part, on a first subset of context information of the plurality of subsets of context information. Additionally, the instructions can cause the one or more processors to facilitate access to the model for identifying circumstances associated with a likelihood that a provider of the one or more providers will contact an enterprise of the provider network with respect to provisioning a specific product to a specific user.

A non-transitory computer-readable storage medium having stored therein instructions which, when executed by one or more processors, cause the one or more processors to access context information related to one or more providers provisioning one or more products in relation to one or more workflows for provisioning the one or more products through a provider network. The instructions can also cause the one or more processors to separate the context information into a plurality of subsets of context information. Further, the instructions can cause the one or more processors to train a model based, at least in part, on a first subset of context information of the plurality of subsets of context information. Additionally, the instructions can cause the one or more processors to facilitate access to the model for identifying circumstances associated with a likelihood that a provider of the one or more providers will contact an enterprise of the provider network with respect to provisioning a specific product to a specific user.

Description

As discussed previously, maintaining quality relationships with customers is vitally important to enterprise product providers. In particular, it is important that enterprise product providers maintain quality relationships with the individuals who provide the products to users and thereby act as customers to the enterprise product providers. For example, it is important that suppliers of dental products and services maintain quality relationships with the dentists, e.g. orthodontists, who provision the products and services to patients.

Central to maintaining quality relationships with product providers is providing superior customer service to the providers throughout various stages of workflows associated with provisioning products through the providers. Such customer service can include engaging in interactions with the providers to address their questions, comments, and concerns during the various stages of the workflows. For example, it is important during a workflow for creating dental aligners for a patient, that the interactions with an orthodontist are sufficiently addressed. However, as the workflows associated with provisioning products become more and more complex, it becomes difficult for an enterprise to sufficiently address communications with product providers.

Customer service can be improved by anticipating circumstances associated with a customer interacting with an enterprise product provider, e.g. before the customer actually interacts with the enterprise product provider. More specifically, customer service can be improved if either or both a time/time window during which a customer is likely to contact an enterprise product provider and subject(s) that the customer is likely to address during the contact are identified before the customer actually contacts the enterprise product provider. In turn, representatives for the enterprise product provider can proactively contact customers based on the anticipated circumstances before the customers actually contact the enterprise product provider, thereby improving customer service. Proactively reaching out to customers before they contact an enterprise product provider has additional benefits beyond the improved experience of the customer. Specifically, cancellation rates for ordered products can be reduced, thereby leading to increased financial gains for the enterprise product provider. Further, the workloads of customer service representatives can actually be reduced.

While anticipating circumstances associated with a customer interacting with an enterprise product provider can provide many benefits to the enterprise product provider, it is difficult to accurately predict such circumstances. Specifically, as workflows associated with provisioning products of an enterprise become more complex, it is difficult to anticipate circumstances associated with customers contacting the enterprise. More specifically, the number of variables of the workflows and the vast differences in provider behaviors make it difficult for a human mind to predict when a customer will contact an enterprise product provider and what subjects the customer might address during such contact. For example, a workflow for providing dental aligners to an orthodontist as part of a treatment plan is complex and subject to change. Specifically, impressions for the dental aligner might be rejected, thereby adding complexity to the workflow. There therefore exist needs for more accurately predicting circumstances associated with a customer interacting with an enterprise product provider. As follows, there exist needs for acting on such predictions and facilitating performance of remedial actions based on the predicted circumstances associated with a customer interacting with an enterprise product provider.

The present includes systems, methods, and computer-readable media for solving these problems/discrepancies. Specifically, the present technology involves system, methods, and computer-readable media for identifying circumstances associated with a likelihood that a customer will contact an enterprise product provider based on context information. Additionally, the present technology involves systems, methods, and computer-readable media for facilitating performance remedial actions based on anticipated circumstances associated with a likelihood that a customer will contact an enterprise product provider.

FIG. 1 illustrates an example environment 100 for managing enterprise contact with a product provider based on context information associated with providers provisioning products. The environment 100 shown in FIG. 1 includes a context-based customer contact management system 102, a provider contact interface 104 a first provider 108-1 to N providers 108-N (herein referred collectively as the "providers 108"), and a user 110.

The providers 108 are coupled to the context-based customer contact management system 102 and the provider contact interface 104 through the provider network 106. The provider network 106 can be maintained by, or otherwise associated with, an enterprise product provider. An enterprise product provider, as used herein, is an entity responsible for manufacturing and distributing products to product providers. A product provider, as used herein, is an entity or person who is responsible for provisioning products received from the enterprise product provider to users. Specifically, in the environment 100 shown in FIG. 1, an enterprise product provider, or otherwise an enterprise of the provider network 106, can manufacture products that are then distributed to the product providers 108. As follows, the product providers 108 can provide the products to users, e.g. user 110, thereby serving as intermediaries between the user and the enterprise. For example, the enterprise of the provider network 106 can be a supplier of dental braces, and the providers 108 can be orthodontists who provide the dental braces to users, e.g. patients.

The enterprise product provider can interact with the providers 108 through the provider network 106 as part of distributing products to the providers 108. For example, an orthodontist can interact with a dental brace provider through the provider network 106 with respect to changes to a treatment plan for providing dental aligners to a patient. Accordingly, the provider network 106 can be formed, at least in part, through an applicable communication network for facilitating communication between the enterprise product provider and the providers 108. Further, the enterprise product provider and the providers 108 can exchange physical items, e.g. products, with each other through the provider network 106. For example, an orthodontist can receive a dental brace that is manufactured by the enterprise product provider through the provider network 106. Accordingly, the provider network 106 can be formed, at least in part, through an applicable physical shipment network.

The providers 108 can be disassociated from the enterprise of the provider network 106. Specifically, the providers 108 can be representatives of the enterprise in their capacity to provision products provided by the enterprise, but otherwise remain distinct from the enterprise product provider. As a result, the providers 108 can be customers of the enterprise product provider. More specifically, the providers 108 can be customers in that they place or otherwise facilitate the placement of orders for products from the enterprise, e.g. through the provider network 106, and receive the products, e.g. through the provider network 106.

Products can be provisioned from the enterprise product provider to the providers 108 through the provider network 106 according to one or more workflows for provisioning the products through the provider network 106. Further, the products can be provisioned by the providers 108 to users according to the one or more workflows. A workflow associated with provisioning a product through a provider network, as used here, includes applicable operations or activities that are organized to facilitate within the workflow to facilitate provisioning of the product through the provider network. For example, a workflow associated with provisioning a dental brace can include an orthodontist obtaining an impression of a patient and placing an order for the dental brace to be manufactured based on the impression. Workflows associated with provisioning a product through a provider network can be extremely complex and include a large number of separate operations or activities that are performed. As follows and as will be discussed in greater detail later, such complexity makes it difficult to predict circumstances associated with the workflows, e.g. circumstances associated with a likelihood that the providers 108 will contact the enterprise in relation to provisioning of a product through the provider network 106.

Additionally, a workflow associated with provisioning a product through a provider network can change based on events that occur, e.g. during the workflow. Specifically, a workflow associated with provisioning a product can include conditional activities that are triggered in the workflow based on the occurrence of certain events during the workflow. For example, a workflow associated with provisioning dental aligners can change to include gathering new impression if submitted impressions are rejected. The changing nature of workflows associated with provisioning products through provider networks further add to the complexity of such workflows. As follows and as will be discussed in greater detail later, such complexity makes it difficult to predict circumstances associated with the workflows, e.g. circumstances associated with a likelihood that the providers 108 will contact the enterprise in relation to provisioning of a product through the provider network 106.

In the example environment 100 shown in FIG. 1, the context-based customer contact management system 102 and the provider contact interface 104 are shown to be separate from the provider network 106. However, in various embodiments, the context-based customer contact management system 102 and the provider contact interface 104 can be included as part of the provider network 106. Further, in the example environment 100 shown in FIG. 1, the context-based customer contact management system 102 and the provider contact interface 104 are integrated as part of the enterprise product provider. Specifically, the context-based customer contact management system 102 and the provider contact interface 104 are integrated as part of the enterprise product provider for controlling customer contact, e.g. contact with the providers 108, based on context associated with provisioning of products, e.g. through the provider network 106.

The context-based customer contact management system 102 functions to manage communications between the enterprise product provider and the providers 108 based on contexts associated with provisioning of products. Specifically, the context-based customer contact management system 102 functions to manage communications between the enterprise product provider and the providers 108 based on contexts associated with providers provisioning products of the enterprise product provider through the provider network 106. Products of the enterprise product provider that are the subject of the context information, as used herein, can include both goods that are physically provisioned to users and services that are provisioned to the users. Specifically, products can include a good that is provisioned to the user and the services that are rendered to provision the good to the user. For example, dental products can include dental aligners that are provisioned to patients by orthodontists and the services, e.g. impression acquisition, that are rendered to the patients, e.g. as part of provisioning the dental aligners to the patients.

Contexts associated with the providers 108 provisioning products of the enterprise can include applicable information describing circumstances associated with the providers 108 actually provisioning products through the provider network 106. For example, context information can include information describing characteristics of the providers 108, e.g. geographic information of the providers 108, provider types of the providers, statuses of the providers 108 with respect to the enterprise product provider, information related to certification of the providers 108 with respect to the enterprise product provider. Further, contexts associated with the providers 108 provisioning products of the enterprise can include applicable information describing circumstances associated with the providers 108 provisioning products in relation to one or more workflows for provisioning the products. For example, context information can include information describing statuses of orders within a workflow for provisioning products that are the subjects of the orders, e.g. a current order status, a previous status of a current order, and an amount of time since the order status changed.

In managing communications between the enterprise product provider and the providers 108, the context-based customer contact management system 102 can manage the communications based on circumstances associated with a likelihood that the providers 108 will contact the enterprise. Specifically, the context-based customer contact management system 102 can manage the communications based on circumstances associated with a likelihood that the providers 108 will contact the enterprise with respect to provisioning products to users through the provider network 106. More specifically, the context-based customer contact management system 102 can manage communications based on circumstances associated with a likelihood that the providers 108 will contact the enterprise with respect to provisioning a product in relation to one or more workflows for provisioning the product.

Circumstances associated with a likelihood that the providers 108 will contact the enterprise, as used herein, include applicable information regarding a likelihood that the provider 108 will contact the enterprise with respect to provisioning products through the provider network 106. Specifically, the circumstances can include one or more probabilities that a provider will contact the enterprise. For example, the circumstances can include that there is a 95% probability that an orthodontist will contact a dental brace supplier. Further, the circumstances can include one or more temporal probabilities that a provider will contact the enterprise. A temporal probability, as used herein includes some measure of time and a probability that a provider will contact the enterprise in relation to the measure of time. For example, the circumstances can include that there is a 75% chance that a provider will contact the enterprise within two days. Additionally, the circumstances can include one or more subjects that a provider might address when contacting the enterprise. The subjects can include topics that are specific to the provider actually provisioning a product through the product network 106. For example, the circumstance can include that an orthodontist will contact a dental product supplier regarding changes to a treatment plan for dental aligners.

The context-based customer contact management system 102 can identify circumstances associated with a likelihood that the providers 108 will contact the enterprise based on contexts associated with provisioning of products. More specifically, the context-based customer contact management system 102 can identify circumstances associated with a likelihood that the providers 108 will contact the enterprise based on contexts associated with the providers 108 provisioning products of the enterprise through the provider network 106. For example, the context-based customer contact management system 102 can identify circumstances associated with a likelihood that a dental provider will contact a dental supplier based on contexts associated with the provider provisioning dental products of the dental supplier.

In identifying such circumstances associated with a likelihood that the providers 108 will contact the enterprise, the context-based customer contact management system 102 can identify such circumstances in relation to specific future events. Specifically, the context-based customer contact management system 102 can identify the circumstances associated with a likelihood that the providers 108 will contact the enterprise before the providers 108 actually contact the enterprise. Further, the context-based customer contact management system 102 can identify the circumstances in relation to events that will occur according to one or more workflows for provisioning products. For example, the context-based customer contact management system 102 can identify the circumstances after the products are ordered by the providers 108 and before the products are invoiced.

In managing communications between the enterprise product provider and the providers 108, the context-based customer contact management system 102 can facilitate one or more remedial actions to address a provider contacting or otherwise potentially contacting the enterprise. Specifically, the context-based customer contact management system 102 can facilitate one or more remedial actions based on identified circumstances associated with a likelihood that the provider will contact the enterprise product provider. For example, if there is a 90% chance that a dental provider will contact a dental product provider, then the context-based customer contact management system 102 can facilitate one or more remedial actions to address the dental provider potentially contacting the dental product provider. In another example, if it is identified that a dental provider will contact a dental product provider in regards to rejected impressions, then the context-based customer contact management system 102 can facilitate one or more remedial actions to address the dental provider potentially contacting in regards to the rejected impressions.

Remedial actions to address a provider contacting or otherwise potentially contacting the enterprise, as used herein, include applicable actions that can be performed or otherwise facilitated through the enterprise product provider to address the provider potentially contacting the enterprise. Specifically, remedial actions can include presenting the identified circumstances related to potential provider contact to a representative of the enterprise product provider. For example, remedial actions can include informing a customer service representative that there is a 95% chance that an orthodontist will contact the enterprise regarding a recent clinical hold. Additionally, remedial actions can include instructing the representative to contact the provider, e.g. within a specific amount of time. Further, remedial actions can include providing a list of providers to contact within the next 48 hours to the customer service representative based on the likelihoods that the providers will contact the enterprise.

The context-based customer contact management system 102 can facilitate performance of remedial actions through the provider contact interface 104. Specifically, the provider contact interface 104 functions as an interface through which the enterprise product provider can contact the provider 108. As follows, the context-based customer contact management system 102 can instruct representatives to contact or facilitate the representatives contacting the providers 108 through the provider contact interface 104.

Figure 2:
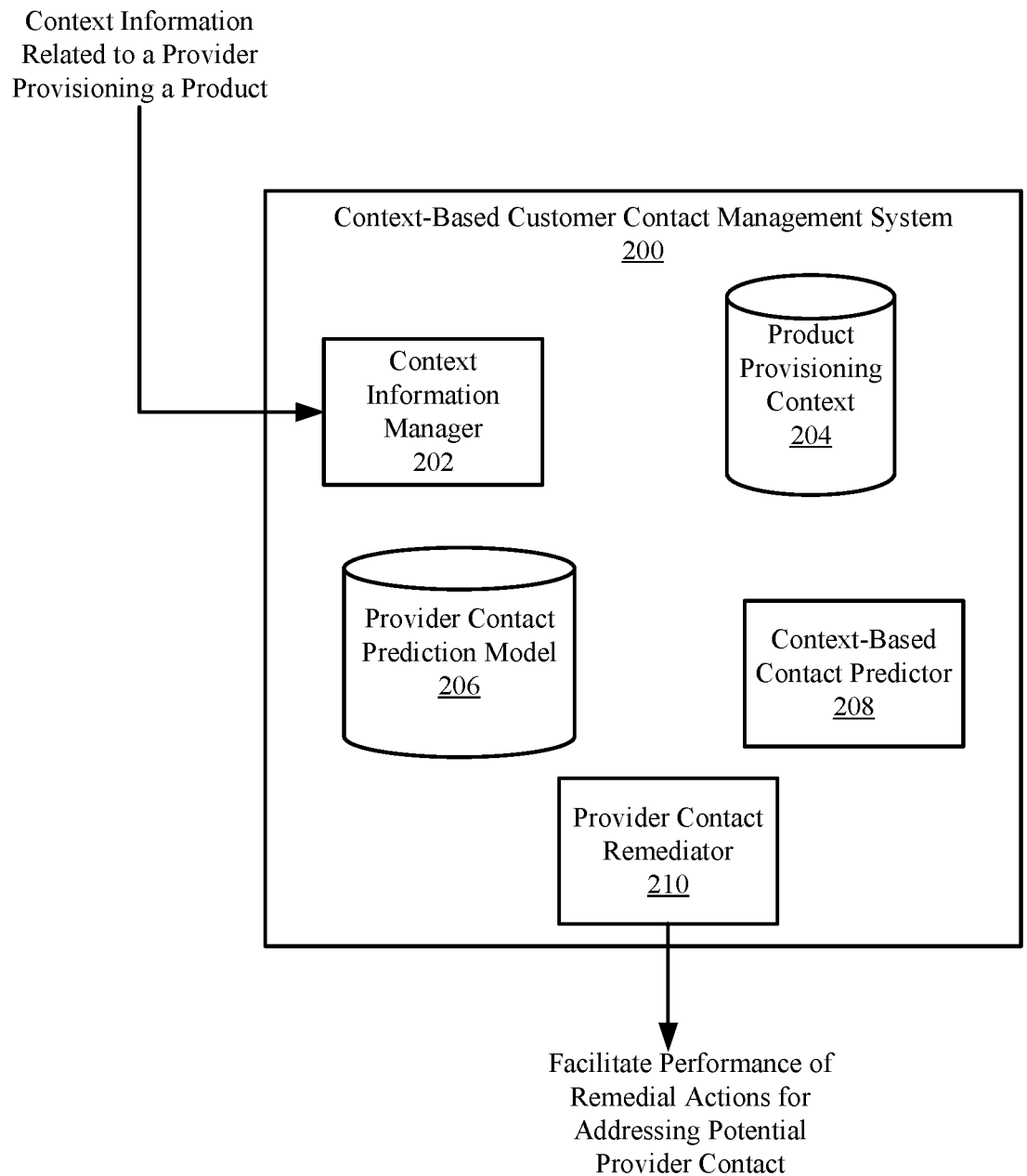
FIG. 2 illustrates an example context-based customer contact management system for managing communications between an enterprise product provider and a provider based on context information related to the provider provisioning products associated with the enterprise, in accordance with some examples.

FIG. 2 illustrates an example context-based customer contact management system 200 for managing communications between an enterprise product provider and a provider based on context information related to the provider provisioning products associated with the enterprise. The example context-based customer contact management system 200 shown in FIG. 2 can be implemented in an applicable environment, such as the environments discussed herein. Specifically, the context-based customer contact management system 200 can be implemented to control customer contact between dental care providers and a dental product supplier through a dental care provider network of the dental product supplier.

The example context-based customer contact management system 200 shown in FIG. 2 includes a context information manager 202, a product provisioning context datastore 204, a provider contact prediction model datastore 206, a context-based contact predictor 208, and a provider contact remediator 210.

The context information manager 202 functions to access context information related to a provider provisioning a product. In accessing context information related to a provider provisioning a product, the context information manager 202 can retrieve and/or generate the context information. As follows, the context information manager 202 can store the retrieved and/or generated context information in the product provisioning context datastore 204. In accessing context information related to a provider provisioning a product, the context information manager 202 can be integrated as part of, or otherwise have access to, a customer relationship management (herein "CRM") system of an enterprise product provider. For example, the context information manager 202 can gather context information of a product provider/customer of an enterprise product provider through a CRM system used by the enterprise in managing customer relationships. Further, the context information manager 202 can be integrated as part of, or otherwise have access to, a product order management system of an enterprise product provider.

Context information stored in the product provisioning context datastore 204, e.g. by the context information manager 202, can include gathered past data regarding provisioning of a product by one or more providers. Specifically, context information stored in the product provisioning context datastore 204 can include information describing past behaviors of a provider in provisioning products. For example, context information stored in the product provisioning context datastore 204 can indicate that an orthodontist calls a dental product provider each time a treatment plan is changed. Further and as will be discussed in greater detail later, context information stored in the product provisioning context datastore 204 can include information describing a current provisioning of a product by one or more providers, e.g. through one or more current workflows. For example, context information stored in the product provisioning context datastore 204 can indicate a current state of orders made by an orthodontist.

The provider contact prediction model datastore 206 functions to store one or more models for identifying circumstances associated with a likelihood that a provider will contact an enterprise product provider. The models can identify the circumstances based on input context information related to providers provisioning products, as is stored in the product provisioning context datastore 204 or otherwise accessed by the context information manager 202. For example, context information indicating past behaviors of a product provider and a current state of orders for the product provider can be provided as input to a model stored in the provider contact prediction model datastore 206. Further in the example, the model can output, based on the context information, probabilities/temporal probabilities that the product provider will contact an enterprise product provider. Additionally, the model can output, based on the context information, issues that the product provider is likely to address when contacting the enterprise.

As will be discussed in greater detail later, the models stored in the provider contact prediction model datastore 206 can be trained from previously gathered context information, e.g. information related to one or more providers previously provisioning one or more products. Further, and as will be discussed in greater detail later, the models can be updated with newly gathered context information, e.g. information related to providers currently provisioning products. The models can be trained across context information for a plurality of different providers. Further, the models can be trained across context information for a plurality of different products that are provisioned by one or more providers.

The context-based contact predictor 208 functions to apply the one or more models stored in the provider contact prediction model datastore 206. Specifically, the context-based contact predictor 208 can identify circumstances associated with a likelihood that a provider will contact an enterprise product provider by applying one or more models from the provider contact prediction model datastore 206. More specifically, the context-based contact predictor 208 can apply the one or more models to context information accessed by the context information manager 202 to identify circumstances associated with a likelihood that the provider will contact the product provider enterprise.

The provider contact remediator 210 functions to facilitate performance of remedial actions for addressing potential provider contact to the enterprise product provider. Specifically, the provider contact remediator 210 functions to facilitate performance of one or more remedial actions based on circumstances associated with the likelihood that a provider will contact the enterprise, as identified by the context-based contactor predictor. The provider contact remediator 210 can facilitate performance of remedial actions irrespective of the provider actually contacting the enterprise. For example, the provider contact remediator 210 can cause a representative of the enterprise to contact a provider before the provider attempts to contact the enterprise. The provider contact remediator 210 can facilitate performance of the remedial actions at specific times. For example, the provider contact remediator 210 can cause a representative of the enterprise to contact a provider before a placed order is actually shipped to the provider.

In facilitating performance of remedial actions based on circumstances associated with a likelihood that a provider will contact the enterprise, the provider contact remediator 210 can select remedial actions to perform based on the circumstances. Specifically, the provider contact remediator 210 can select remedial actions to perform based on identified probabilities or temporal probabilities that a provider will contact the enterprise. For example, if a dentist has a less than 50% chance of contacting a dental product provider, then the provider contact remediator 210 can instruct a contact representative to contact the dentist in the next two weeks and only if the representative has time. Further, the provider contact remediator 210 can select remedial actions to perform based on identified subjects that a provider might address when contacting the enterprise. For example, if it is predicted that a dentist will address a clinical treatment check, then the provider contact remediator 210 can instruct a contact representative to reach out to the dentist regarding the clinical treatment check.

Figure 3:
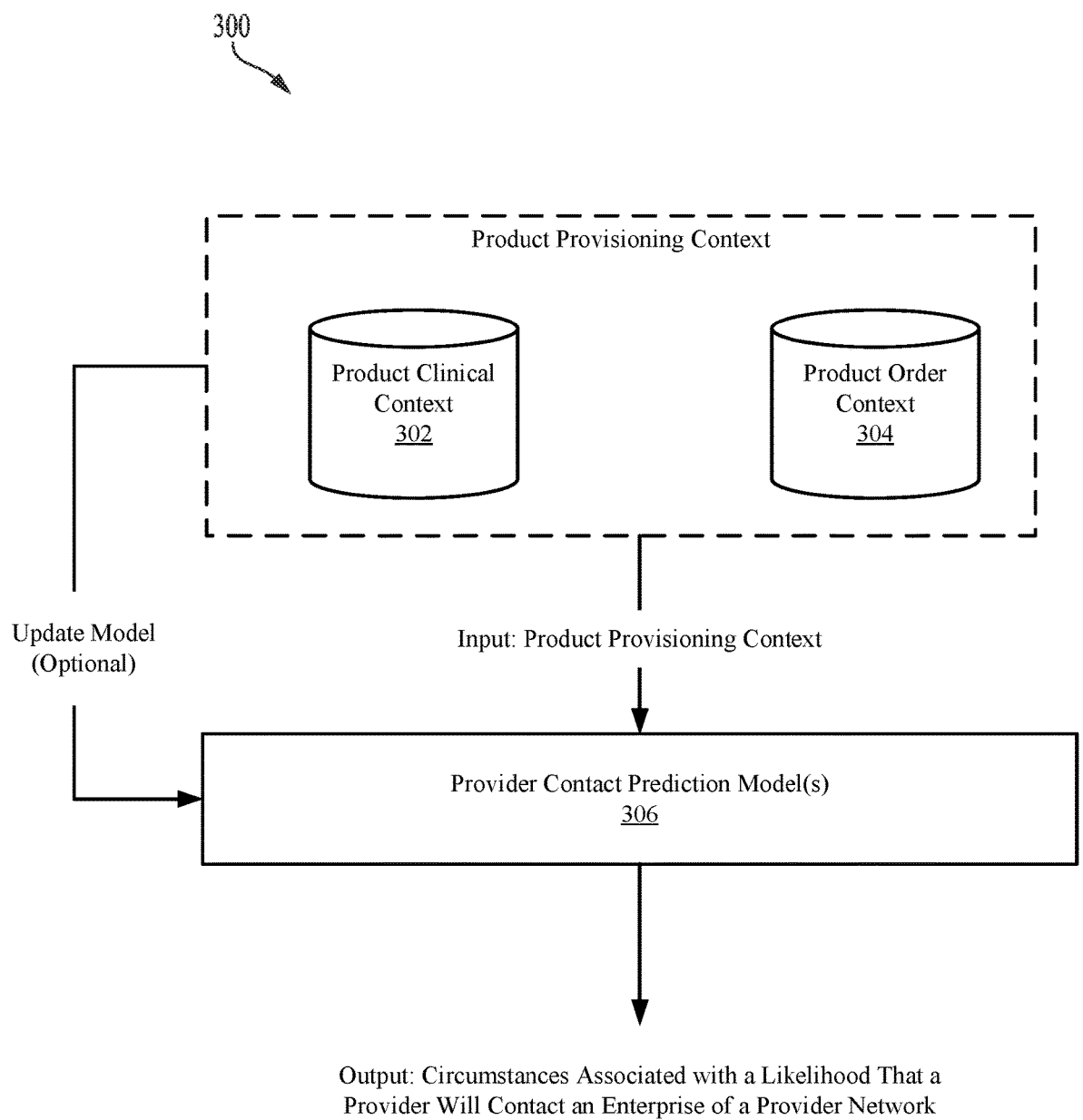
FIG. 3 illustrates an example environment for applying a model to predict circumstances associated with a likelihood that a provider will contact an enterprise based on a context associated with the provider provisioning products associated with the enterprise, in accordance with some examples.

FIG. 3 illustrates an example environment 300 for applying a model to predict circumstances associated with a likelihood that a provider will contact an enterprise based on a context associated with the provider provisioning products associated with the enterprise. The environment 300 that is shown in FIG. 3 for predicting the circumstances based on context can be applied in an applicable environment, such as the environments described herein. Specifically, the techniques for predicting the circumstances based on context that are shown in the environment 300 can be implemented through an applicable system, such as the context-base customer contact management systems described herein.

The example environment 300 shown in FIG. 3 includes a product clinical context datastore 302, a product order context datastore 304, and provider contact prediction model(s) 306. The product clinical context datastore 302 and the product order context datastore 304 can store product provisioning context information. Specifically, the product clinical context datastore 302 and the product order context datastore 304 can store product provisioning context information that can be applied as input to the provider contact prediction model(s) 306. In turn, the provider contact prediction model(s) 306 can output circumstances associated with a likelihood that a provider will contact an enterprise of a provider network based on the input context information.

The product clinical context datastore 302 functions to store context data related to clinical aspects of a provider provisioning products associated with an enterprise product provider. Specifically, the product clinical context datastore 302 can store context data related to clinical aspects of a provider provisioning products in relation to one more workflows. Clinical aspects of a provider provisioning products include applicable information related to treatment of actual patients through provisioning of products by a product provider. Specifically and in the field of dentistry, context data stored in the product clinical context datastore 302 can include clinical aspects of an orthodontist providing dental aligners to a patient as part of a treatment plan. For example, context data related to clinical aspects of product provisioning can include one or a combination of a type of scanner used to inspect a patient, a number of arches that are being treated, a patient type, and other applicable information related to a treatment plan of a patient.

The product order context datastore 304 functions to store context data related to products ordered by a provider. Specifically, the product order context datastore 304 can store context data related to products ordered by a provider in relation to one or more workflows. For example, context data related to products ordered by a provider can include a number of product orders canceled within a certain time window, a number of product orders places within a certain time window, a status of a current or previous order, and how often an order is changed. Further, context data related to products ordered by a provider can include behaviors of the provider in interacting with an enterprise product provider in relation to the orders. For example, the context data can include a call frequency of a provider after placing an order for a product.

TABLE 1

| type | name | description |
|---|---|---|
| categorical | wday | Day of week (UTC) |
| categorical | month | Month number |
| categorical | ph1 | Product hierarchy level 1 |
| categorical | patient_type | Patient type (Adult, Child, Teen) |
| categorical | cust_city | Account city |
| categorical | cust_state | Account State |
| categorical | sh2 | Sales Hierarchy level |
| categorical | status_lag_0 | Previous (Lag 0) known order status |
| categorical | status_lag_1 | Previous (Lag 1) known order status |
| categorical | status_lag_2 | Previous (Lag 2) known order status |
| categorical | status_lag_3 | Previous (Lag 3) known order status |
| numeric | sub_90d | Submissions for this customer during time range until snapshot ts (90 days) |
| numeric | sub_180d | Submissions for this customer during time range until snapshot ts (180 days) |
| numeric | sub_360d | Submissions for this customer during time range until snapshot ts (360 days) |
| numeric | sub_lt | Submissions for this customer during time range until snapshot ts (lifetime) |
| numeric | cnls_90d | Cancellations for this customer during time range until snapshot ts (90 days) |
| numeric | cnls_180d | Cancellations for this customer during time range until snapshot ts (180 days) |
| numeric | cnls_360d | Cancellations for this customer during time range until snapshot ts (360 days) |
| numeric | cnls_lt | Cancellations for this customer during time range until snapshot ts (lifetime) |
| numeric | cnl_rate_90d | Cancellation rate (cancellations/submissions) for this customer during time range until snapshot ts (90 days) |
| numeric | cnl_rate_180d | Cancellation rate (cancellations/submissions) for this customer during time range until snapshot ts (180 days) |
| numeric | cnl_rate_360d | Cancellation rate (cancellations/submissions) for this customer during time range until snapshot ts (360 days) |
| numeric | cnl_rate_lt | Cancellation rate (cancellations/submissions) for this customer during time range until |

TABLE 1-continued

| type | name | description |
|---|---|---|
| | | snapshot ts (lifetime) |
| numeric | c_90d | Number of calls for this customer during time range before snapshot timestamp (90 days) |
| numeric | c_180d | Number of calls for this customer during time range before snapshot timestamp (180 days) |
| numeric | c_360d | Number of calls for this customer during time range before snapshot timestamp (360 days) |
| numeric | c_lt | Number of calls for this customer during time range before snapshot timestamp (lifetime) |
| numeric | c_rate_sub_90d | Call rate for customer per submission during time range until snapshot ts (90 days) |
| numeric | c_rate_sub_180d | Call rate for customer per submission during time range until snapshot ts (180 days) |
| numeric | c_rate_sub_360d | Call rate for customer per submission during time range until snapshot ts (360 days) |
| numeric | c_rate_sub_lt | Call rate for customer per submission during time range until snapshot ts (lifetime) |
| numeric | calls_order | Number of calls since order initiation |
| numeric | calls_orderstate | Number of calls since last order status change |
| numeric | hrs_since_sub | Hours since order submission |
| numeric | hrs_since_call_ord | Hours since the last call for this order (if any) |
| numeric | hrs_since_call_cust | Hours since the last call for this customer (if any) |
| numeric | hour | Hour of day (UTC) |
| numeric | year | Year |
| numeric | days_to_qend | Days left till quarter end |
| numeric | days_cert | Days certified |
| numeric | cust_latitude | Account Latitude |
| numeric | cust_longitude | Account Longitude |
| numeric | c_rate_status_90d | Average call count for customer-status during time range until snapshot ts (90 days) |
| numeric | c_rate_status_180d | Average call count for customer-status during time range until snapshot ts (180 days) |
| numeric | c_rate_status_360d | Average call count for customer-status during time range until snapshot ts (360 days) |
| numeric | c_rate_status_lt | Average call count for customer-status during time range until snapshot ts (lifetime) |
| numeric | hrs_since_status | Hours passed since last status update |

Table 1 shows examples of different types of product provisioning context data. Specifically, Table 1 includes context data related to clinical aspects of a provider provisioning products associated with an enterprise product provider. Further, Table 1 includes context data related to products ordered by a provider.

Product provisioning context data stored in the product clinical context datastore 302 and the product order context datastore 304 can include temporal product provisioning context data. Temporal product provisioning context information can represent aspects related to provisioning of products at different times during one or more workflows. Specifically, temporal product provisioning context information can include snapshots of context information at different times of a workflow associated with provisioning a product. Context information at different snapshots can include any of the context information, as described herein, that exists at a given time or within a given time frame in relation to one or more workflows. For example, Table 2, shows examples of different types of context information that can be included as part of temporal product provisioning context information.

TABLE 2

| Time | Monday, December, 2018, Q4, 11:00 PM |
|---|---|
| Customer | GP, Non-DSO, Silver Tier, certified 2264 days ago |
| Customer geography | San Francisco, California, Latitude: 3X, Longitude: -12X |
| Status | Rejected Impressions (current), Materials Pending (previous) |
| Status changed | 19.73 hours ago |
| Order submitted | 74 hours age |
| Last time called | 759 hours ago |
| Product | Comprehensive Treatment |
| Scan type | PVS |
| Patient Type | Adult |
| Calls far this order | 0 |
| Calls for this order status | 0 |

Product provisioning context data stored in the product clinical context datastore 302 and the product order context datastore 304 can include temporal product provisioning context data over a period of times and time periods. Specifically, product provisioning context data stored in the product clinical context datastore 302 and the product order context datastore 304 can include past product provisioning context data for a given provider. Such context data can extend across different products that were provisioned by the provider. For example, product provisioning context data can indicate that an orthodontist has a 16% cancellation rate over their lifetime. More specifically, Table 3 shows product provisioning context data that is maintained over different periods of time for a provider.

TABLE 3

| | 90 days | 180 days | 360 days | Lifetime |
|---|---|---|---|---|
| Submissions | 21 | 39 | 72 | 287 |
| Cancellations | 4 | 12 | 12 | 47 |
| Cancellation Rate | 19.05% | 30.77% | 16.67% | 16.38% |
| CS call count | 2 | 18 | 24 | 73 |
| Calls per submission | 9.52% | 46.15% | 33.33% | 25.44% |
| Call frequency after Rejected Impressions | 50.00% | 83.33% | 66.67% | 31.82% |

As discussed previously, the provider contact prediction model(s) 306 can be applied based on the input product provisioning context to output circumstances associated with a likelihood that a provider will contact an enterprise product provider. As follows, one or more remedial actions can be performed based on the circumstances. Specifically, the one or more remedial actions can be selected and performed by comparing one or more probabilities of contact by the provider, as included in the circumstances, with one or more threshold probabilities.

In the example environment shown in FIG. 3, the product provisioning context data that is used as input to the provider contact prediction model(s) 306 can also be optionally applied to update the model(s) 306. Specifically, the product provisioning context data that is provided as input can be used in retraining the model(s) 306 after the output is predicted. More specifically, the product provisioning context data can be provided with other product provisioning context data to retrain the model(s) 306.

As shown, there are a large number of contextual variables that can be used as both input to the model(s) 306 and for training the model(s) to accurately predict circumstances associated with a likelihood that a provider will contact the enterprise. However, based on the application of at least portions of these contextual variables, accuracy in predicting such circumstances is improved, e.g. when compared to the capabilities of a normal human. Specifically, a normal human would be unable to process the large number of contextual variables to accurately predict circumstances associated with a likelihood that a provider will contact the enterprise.

As an example of the results that are achieved in applying the model(s) 306, a probability threshold of 92.6% was set. A probability threshold, in this example, is the threshold that the probability is compared to in determining whether a provider will actually contact an enterprise product provider. For example, all providers that are predicted to have probabilities of contacting the enterprise over 92.6%, as determined through the model(s) 306, are identified as providers who will actually contact the enterprise. Based on such threshold and through application of the model(s) 306, 977 out of 1360 providers were correctly predicted as providers who will contact the enterprise, an overall prediction accuracy of 71.8%. In contrast, randomly contacting customers with active orders can only lead to an accuracy rate of 1.38%. This accuracy rate corresponds to the accuracy in actually contacting customers before they actually contact the enterprise.

Figure 4:
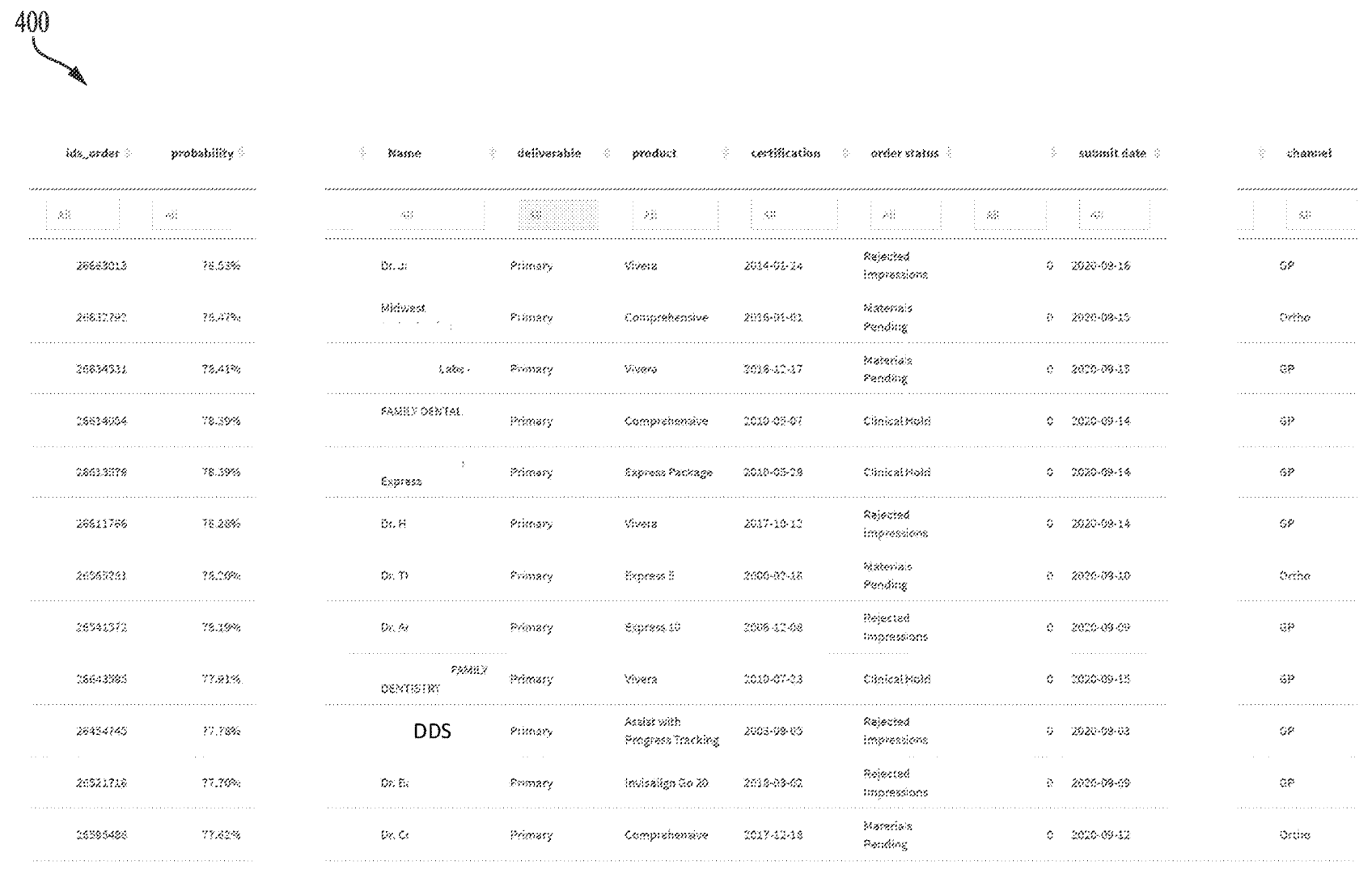

FIG. 4 is a screenshot 400 of an example interface for facilitating performance of remedial actions based on predicted circumstances associated with a likelihood that a provider will contact an enterprise product provider. In particular, the interface can be presented to contact representatives of an enterprise product provider. In turn, the contact representatives can contact different product providers displayed through the interface based on the probability that the providers will contact the enterprise.

Specifically and as shown in the screenshot 400 of FIG. 4, the interface can display the probability that a provider will contact the enterprise, e.g. as determined from application of models based on the context information described herein. Further the interface includes identifications of the providers, names of the providers, statuses of products that are provisioned by the providers, the name of the products that are provisioned by the providers, when the providers obtained certification, a status of the orders of the providers, a number of times a clinical treatment plan has been modified, dates that the orders were submitted by the providers, an indication of whether the providers are part of a dental service organization, and a provider type of the providers.

Figure 5:
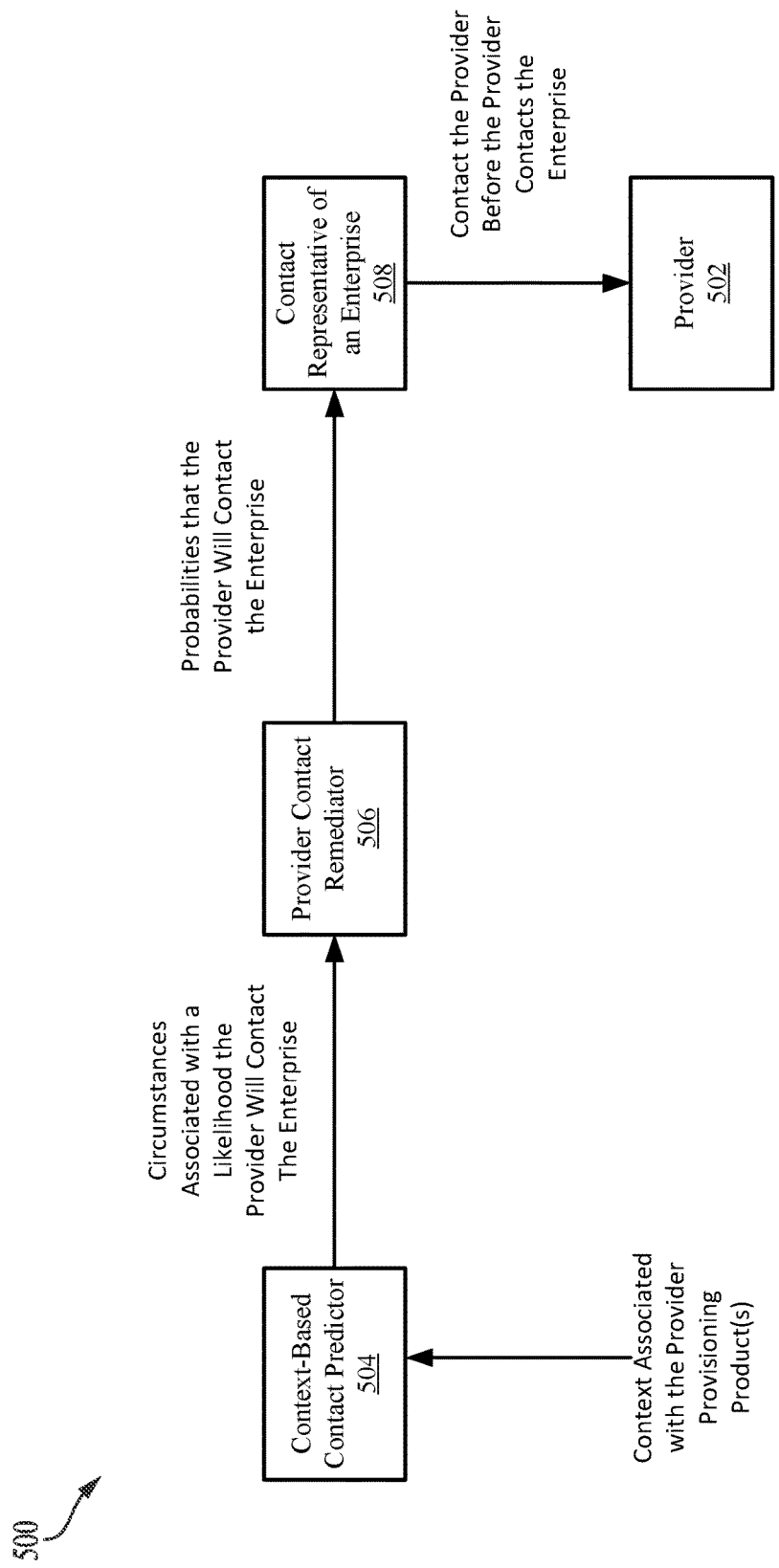
FIG. 5 illustrates an example environment for contacting a provider based on a predicted probability that the provider will contact an enterprise product provider, in accordance with some examples.

FIG. 5 illustrates an example environment 500 for contacting a provider 502 based on a predicted probability that thSe provider 502 will contact an enterprise product provider. The environment 500 includes, in addition to the provider 502, a context-based contact predictor 504, a provider contact remediator 506, and a contact representative of an enterprise 508. The environment 500 for contacting the provider 502 based on the predicted probability that the provider 502 will contact the enterprise can be applied in an applicable environment, such as the environments described herein.

In the example environment 500, the context-based contact predictor 504 receives context information indicating context associated with the provider 502 provisioning product(s). The context-based contact predictor 504 can apply the context information to one or more applicable models for identifying circumstances associated with a likelihood that a provider will contact an enterprise, such as the models described herein. As follows, the context-based contact predictor 504 can output circumstances associated with a likelihood that the provider 502 will contact the enterprise.

The provider contact remediator 506 can receive the outputted circumstances from the context-based contact predictor 504 and facilitate one or more remedial actions based on the circumstances. Specifically, the provider contact remediator 506 can provide probabilities that the provider will contact the enterprise to the contact representative of the enterprise 508. In turn, the contact representative of the enterprise 508 can contact the provider 502 based on the probabilities that are provided by the provider contact remediator 506. Specifically, the contact representative of the enterprise 508 can contact the provider 502 before the provider 502 contacts the enterprise.

Figure 6:
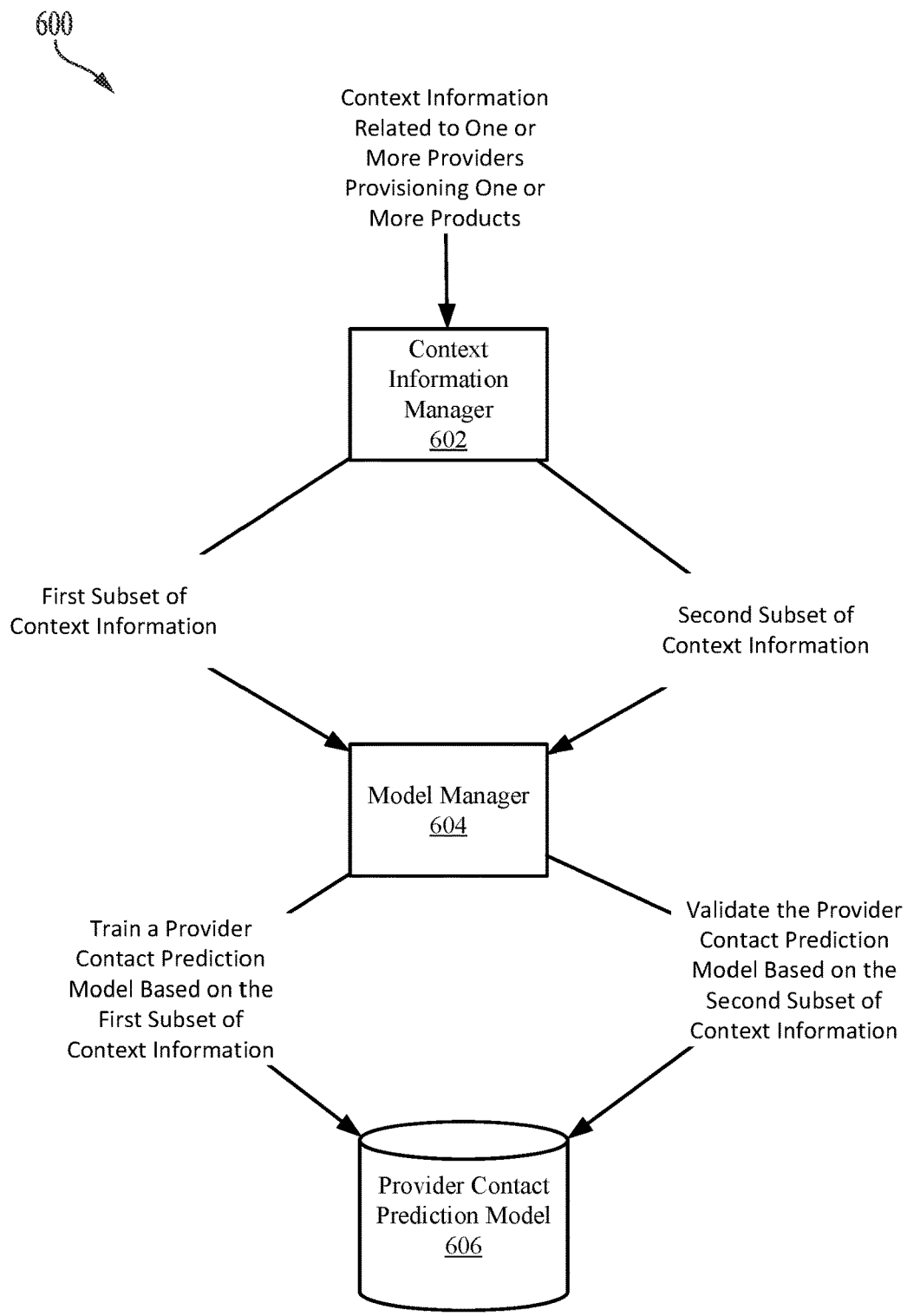
FIG. 6 illustrates an example environment for training a model for identifying circumstances associated with a likelihood that a provider will contact an enterprise based on context, in accordance with some examples.

FIG. 6 illustrates an example environment 600 for training a model for identifying circumstances associated with a likelihood that a provider will contact an enterprise based on context. The environment 600 includes a context information manager 602, a model manager 604, and a provider contact prediction model 606. The environment 600 for training the model for identifying the circumstances associated with a likelihood that the provider will contact the enterprise can be applied in an applicable environment, such as the environments described herein.

In the example environment 600, the context information manager 602 accesses applicable context information related to one or more providers provisioning one or more products, such as the context information described herein. The context information accessed by the context information manager 602 can be information across a plurality of different product providers. Additionally, the context information accessed by the context information manager 602 can be information for the same provisioned product. For example, the context information can be associated with provisioning the same type of dental aligner. Further, the context information accessed by the context information manager 602 can be information across a plurality of different provisioned products or types of provisioned products. For example, the context information can be associated with provisioning different types of dental aligners. The context information manager 602 can access the context information through an applicable source, such as a CRM system of an enterprise product provider and a product order management system of the enterprise product provider.

The context information manager 602 splits the context information into a first subset of context information and a second subset of context information. Specifically, the context information manager 602 can split the context information to facilitate both the training and validation of one or more models. For example, the context information manager 602 can add a majority of the context information to the first subset of context information for training one or more models. As follows, the context information manager 602 can add the remaining context information to the second subset of context information for validating the one or more models.

The model manager 602 accesses the first subset of context information for training and storing one or more models in the provider contact prediction model datastore 606. Specifically, the model manager 602 can train a model, using the first subset of context information, to predict circumstances associated with a likelihood that a provider will contact an enterprise product provider.

Models trained by the model manager 604 can include applicable machine learning models capable of being trained based on context information to predict circumstances associated with a likelihood that a provider will contact an enterprise. Specifically, models trained by the model manager 604 can include applicable machine learning models capable of being trained based on context information related to product provisioning to predict the circumstances.

In the environment 600, the model manager 602 also accesses the second subset of context information for validating the model that is trained based on the first subset of context information. The model manager 602 can validate the model from the second subset of context information using an applicable validation technique. Specifically, parameters of the model can be tuned based on the second subset of context information as part of validating the model. Additionally and while not shown in FIG. 6, a final test set of context information can be used to test the model.

Figure 7:
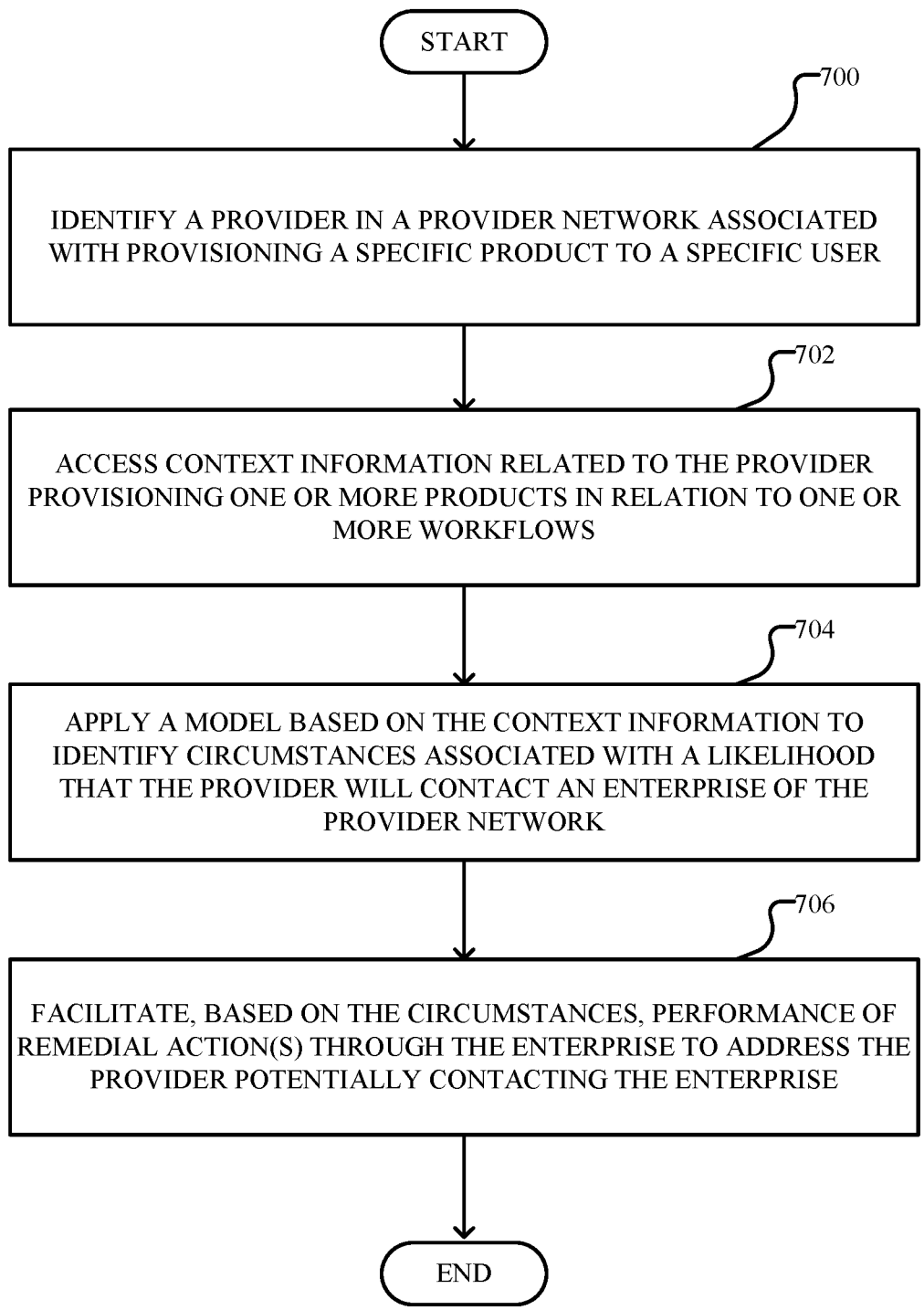
FIG. 7 illustrates a flowchart for an example method of performing remedial actions based on identified circumstances associated with a likelihood that a provider will contact an enterprise product provider, in accordance with some examples.

FIG. 7 illustrates a flowchart for an example method of performing remedial actions based on identified circumstances associated with a likelihood that a provider will contact an enterprise product provider. The method shown in FIG. 7 is provided by way of example, as there are a variety of ways to carry out the method. Additionally, while the example method is illustrated with a particular order of steps, those of ordinary skill in the art will appreciate that FIG. 7 and the modules shown therein can be executed in any order and can include fewer or more modules than illustrated. Each module shown in FIG. 7 represents one or more steps, processes, methods or routines in the method.

At step 700, a provider in a provider network associated with provisioning a specific product to a specific user is identified. For example, an orthodontist who is provisioning dental aligners to a patient can be identified. The provider network and the specific product can be associated with an enterprise product provider. For example, the provider network can include a network of dental product supplier for controlling provisioning of dental aligners that are manufactured by the dental product supplier to patients through various dental providers.

At step 702, context information related to the provider provisioning one or more products in relation to one or more workflows is accessed. The context information can include applicable information related to providers provisioning a product associated with an enterprise product provider, such as the context information described herein. Specifically, the context information can include context data related to clinical aspects of the provider provisioning products associated with the enterprise product provider. Further, the context information can include context data related to the product ordered by the provider.

At step 704, a model is applied based on the context information to identify circumstances associated with a likelihood that the provider will contact the enterprise of the provider network. Specifically, the context information can be applied to a model that is trained based on other context information related to other providers provisioning products in relation to one or more workflows. Additionally, the applied model can be trained based on the previous instances of the current provider provisioning products according to one or more workflows.

At step 706, performance of remedial action(s) are facilitated through the enterprise to address the provider contacting the enterprise based on the circumstances. Such remedial actions can include remedial actions that are performed before the provider contacts the enterprise. Specifically, a contact representative can be instructed to contact the provider before the provider contracts the enterprise based on the circumstances associated with the likelihood that the provider will contact the enterprise.

Figure 8:
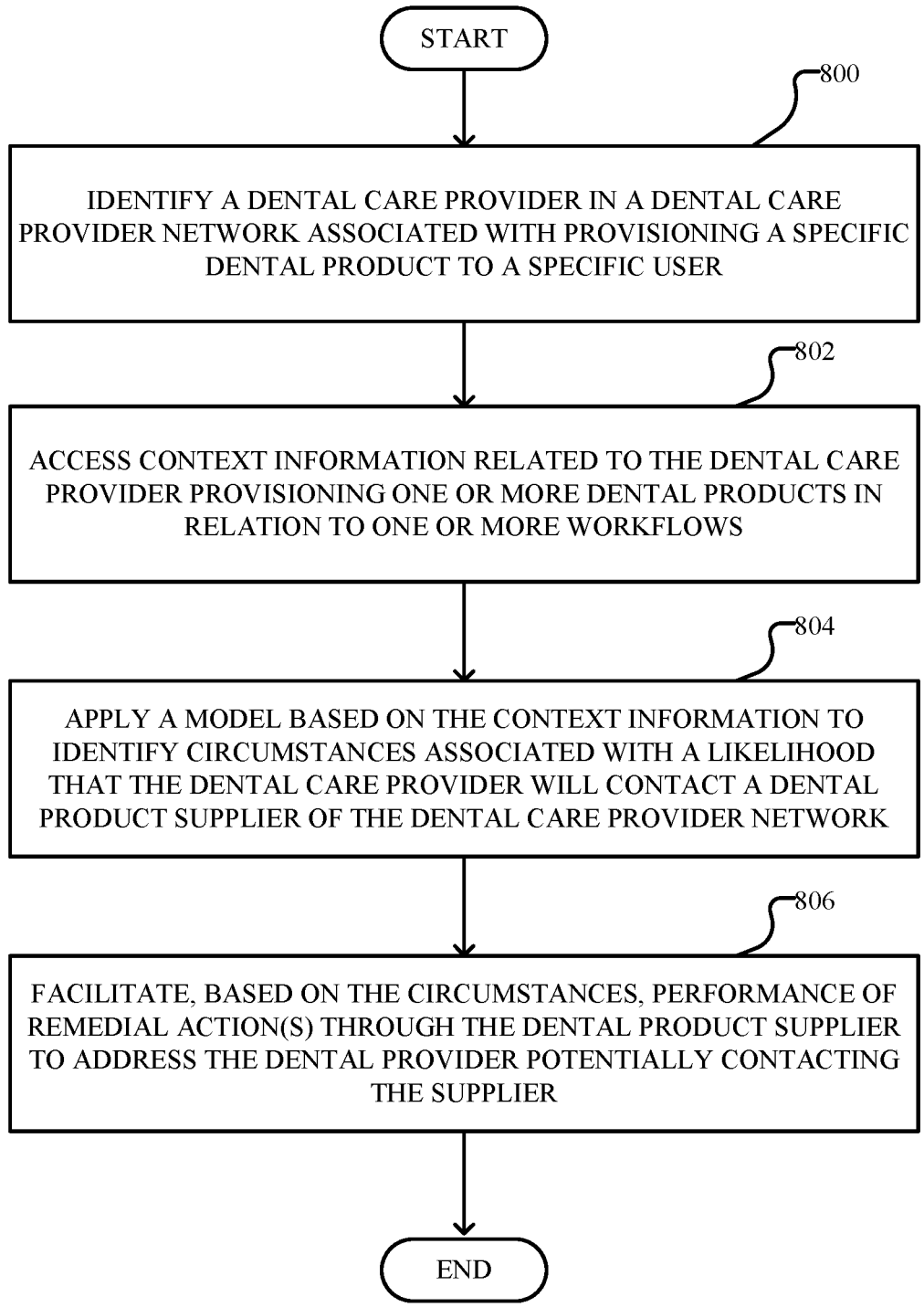
FIG. 8 illustrates a flowchart for an example method of performing remedial actions based on identified circumstances associated with a likelihood that a dental care provider will contact a dental product supplier, in accordance with some examples.

FIG. 8 illustrates a flowchart for an example method of performing remedial actions based on identified circumstances associated with a likelihood that a dental care provider will contact a dental product supplier. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated. Each module shown in FIG. 8 represents one or more steps, processes, methods or routines in the method.

At step 800, a dental care provider in a dental care provider network is identified. The dental care provider network can be a network associated with provisioning a specific dental product to a patient. In particular, the dental care provider network can be a network of a dental product supplier of the dental product.

At step 802, context information related to the dental care provider provisioning one or more dental products in relation to one or more dental product workflows is accessed. The context information can include context information related to provisioning the specific dental product by the dental provider to the specific user. Further, the context information can include context information related to past or other provisioning of dental products by the dental provider.

The one or more dental product workflows can be specific workflows for manufacturing and provisioning dental products as part of a treatment plan for a patient. The one or more dental product workflows can be implemented through the dental care provider network based on tasks carried out between the dental care provider and the dental product supplier. For example, an orthodontist can order dental aligners from a dental product supplier and provider gathered impressions for the dental aligners through a network of the dental product supplier.

At step 804, a model is applied based on the context information to identify circumstances associated with a likelihood that the dental care provider will contact the dental product supplier. The model can be trained based on context information of other dental care providers provisioning dental products. Further, the model can be trained based on context information of the subject dental care provider provisioning dental products, including the specific dental product.

At step 806, performance of remedial action(s) through the dental product supplier to address the dental care provider potentially contacting the dental product supplier are facilitated based on the circumstances. Specifically, remedial action(s) can be selected based on the circumstances associated with the likelihood that the dental care provider will contact the dental product supplier. As follows, the remedial action(s) can be performed based on the circumstances.

Figure 9:
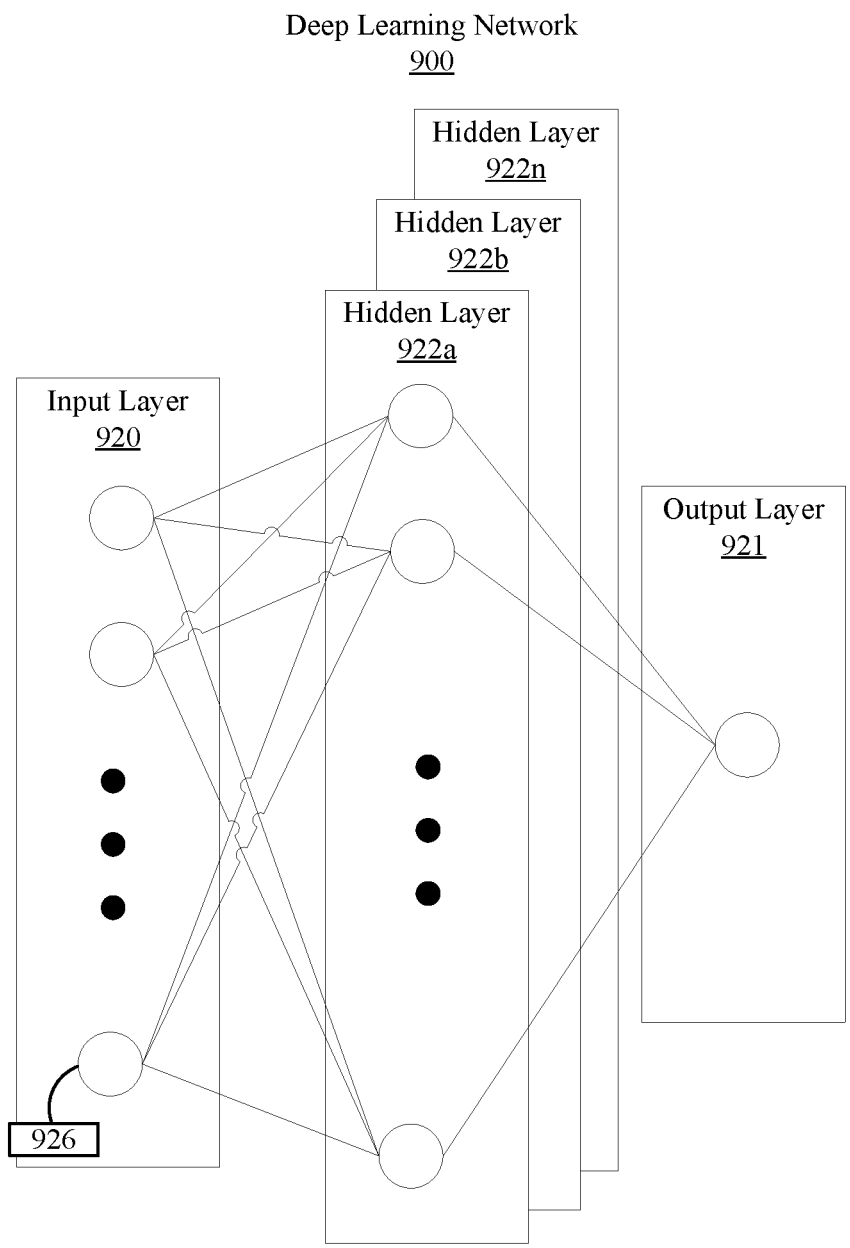
FIG. 9 illustrates an example of a deep learning neural network that can be implemented to identify circumstances associated with a likelihood that a provider will contact an enterprise product provider based on context information, in accordance with some examples.

The disclosure now turns to a further discussion of models that can be used through the environments and techniques described herein. Specifically, FIG. 9 is an illustrative example of a deep learning neural network 900 that can be implemented to identify circumstances associated with a likelihood that a provider will contact an enterprise product provider based on context information. An input layer 920 includes input data. In one illustrative example, the input layer 920 can include context information associated with a product provider provisioning a product. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 921 that provides an output resulting from the processing performed by the hidden layers 922a, 922b, through 922n. In one illustrative example, the output layer 921 can provide a classification for an object in an input video frame. The classification can include a class identifying the type of activity (e.g., playing soccer, playing piano, listening to piano, playing guitar, etc.).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the first hidden layer 922a can transform the information of each input node by applying activation functions to the input node information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 921, at which an output is provided. In some cases, while nodes (e.g., node 926) in the neural network 900 are shown as having multiple output lines, a node can have a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 921.

In some cases, the neural network 900 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 900 is trained well enough so that the weights of the layers are accurately tuned.

As noted above, for a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w\_i-\eta\ dL/dW$, where w denotes a weight, wi denotes the initial weight, and $\eta$ denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm, and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 10:
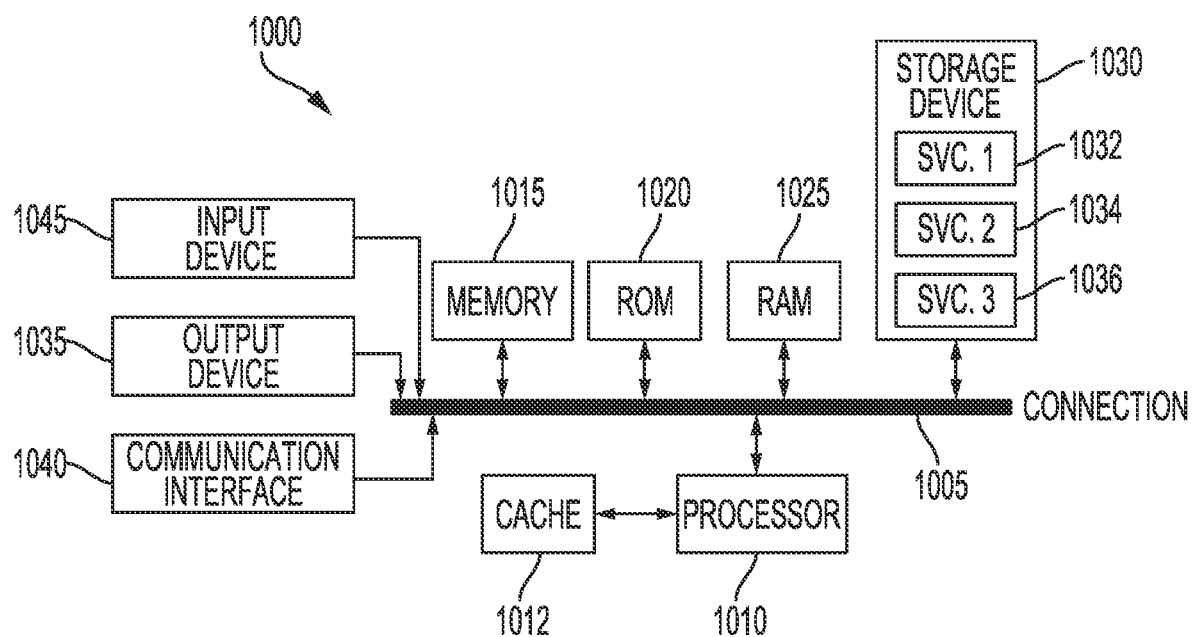
FIG. 10 illustrates an example computing system, in accordance with some examples.

The disclosure now turns to FIG. 10 which illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
identifying a provider in a provider network associated with provisioning a specific product to a specific user;
accessing context information related to the provider provisioning one or more products in relation to one or more workflows for provisioning the one or more products through the provider network;
processing the context information using a trained machine learning model, wherein the trained machine learning model generates an output comprising circumstances associated with a likelihood that the provider will contact an enterprise of the provider network with respect to provisioning of the specific product to the specific user;
facilitating, based on the circumstances associated with the likelihood that the provider will contact the enterprise of the provider network, performance of one or more remedial actions through the enterprise to address the provider contacting the enterprise; and
updating training of the trained machine learning model using the context information, the output of the trained machine learning model, and additional context information associated with a response to the one or more remedial actions.

2. The computer-implemented method of claim 1, wherein the circumstances associated with the likelihood that the provider will contact the enterprise of the provider network include one or more probabilities that the provider will contact the enterprise of the provider network.

3. The computer-implemented method of claim 1, wherein the circumstances associated with the likelihood that the provider will contact the enterprise of the provider network include one or more temporal probabilities that the provider will contact the enterprise of the provider network.

4. The computer-implemented method of claim 1, wherein the circumstances associated with the likelihood that the provider will contact the enterprise of the provider network include one or more subjects that the provider might address when contacting the enterprise and the one or more subjects are identified by applying the trained machine learning model to the context information.

5. The computer-implemented method of claim 4, wherein the one or more subjects are specific to provisioning of the specific product to the specific user.

6. The computer-implemented method of claim 1, wherein the one or more products include the specific product provisioned to the specific user and the context information includes characteristics associated with the provider provisioning the specific product to the specific user in relation to the one or more workflows.

7. The computer-implemented method of claim 1, wherein the context information includes temporal context information that is representative of characteristics at different times during the one or more workflows.

8. The computer-implemented method of claim 1, wherein the context information includes characteristics associated with the provider previously provisioning a product to a user in relation to the one or more workflows.

9. The computer-implemented method of claim 1, further comprising facilitating performance of a remedial action of the one or more remedial actions through the enterprise before the provider contacts the enterprise.

10. The computer-implemented method of claim 1, further comprising:
selecting a remedial action of the one or more remedial actions to perform based on the circumstances associated with the likelihood that the provider will contact the enterprise of the provider network; and
facilitating performance of the remedial action that is selected based on the circumstances associated with the likelihood that the provider will contact the enterprise of the provider network.

11. The computer-implemented method of claim 10, wherein the remedial action to perform is selected based on a probability that the provider will contact the enterprise of the provider network in relation to a threshold probability.

12. The computer-implemented method of claim 10, wherein the remedial action to perform is selected based on one or more subjects that the provider might address when contacting the enterprise as included as part of the circumstances associated with the likelihood that the provider will contact the enterprise of the provider network.

13. The computer-implemented method of claim 10, wherein the remedial action includes providing information describing the circumstances associated with the likelihood that the provider will contact the enterprise of the provider network to a contact representative of the enterprise of the provider network.

14. The computer-implemented method of claim 10, wherein the remedial action includes instructing a contact representative of the enterprise of the provider network to contact the provider irrespective of the provider actually contacting the enterprise of the provider network.

15. The computer-implemented method of claim 1, wherein the
additional context information is related to the provider provisioning the one or more products in response to actual performance of the one or more remedial actions.

16. A system comprising:
one or more processors; and
at least one computer-readable storage medium having stored therein instructions which, when executed by the one or more processors, cause the one or more processors to:
identify a provider in a provider network associated with provisioning a specific product to a specific user;
access context information related to the provider provisioning one or more products in relation to one or more workflows for provisioning the one or more products through the provider network;
process the context information using a trained machine learning model, wherein the trained machine learning model generates an output comprising circumstances associated with a likelihood that the provider will contact an enterprise of the provider network with respect to provisioning of the specific product to the specific user;
facilitate, based on the circumstances associated with the likelihood that the provider will contact the enterprise of the provider network, performance of one or more remedial actions through the enterprise to address the provider contacting the enterprise; and
update training of the trained machine learning model using the context information, the output of the trained machine learning model, and additional context information associated with a response to the one or more remedial actions.

17. The system of claim 16, wherein the circumstances associated with the likelihood that the provider will contact the enterprise of the provider network include one or more probabilities that the provider will contact the enterprise of the provider network.

18. The system of claim 16, wherein the circumstances associated with the likelihood that the provider will contact the enterprise of the provider network include one or more temporal probabilities that the provider will contact the enterprise of the provider network.

19. The system of claim 16, wherein the circumstances associated with the likelihood that the provider will contact the enterprise of the provider network include one or more subjects that the provider might address when contacting the enterprise and the one or more subjects are identified by applying the trained machine learning model to the context information.

20. The system of claim 19, wherein the one or more subjects are specific to provisioning of the specific product to the specific user.

21. The system of claim 16, wherein the one or more products include the specific product provisioned to the specific user and the context information includes characteristics associated with the provider provisioning the specific product to the specific user in relation to the one or more workflows.

22. The system of claim 16, wherein the context information includes at least one of characteristics associated with the provider previously provisioning a product to a user in relation to the one or more workflows, temporal context information that is representative of characteristics at different times during the one or more workflows, or a combination thereof.

23. The system of claim 16, wherein the instructions, when executed by the one or more processors, further cause the one or more processors to facilitate performance of a remedial action of the one or more remedial actions through the enterprise before the provider contacts the enterprise.

24. The system of claim 16, wherein the instructions, when executed by the one or more processors, further cause the one or more processors to:
select a remedial action of the one or more remedial actions to perform based on the circumstances associated with the likelihood that the provider will contact the enterprise of the provider network; and
facilitate performance of the remedial action that is selected based on the circumstances associated with the likelihood that the provider will contact the enterprise of the provider network.

25. The system of claim 24, wherein the remedial action to perform is selected based on a probability that the provider will contact the enterprise of the provider network in relation to a threshold probability.

26. The system of claim 24, wherein the remedial action to perform is selected based on one or more subjects that the provider might address when contacting the enterprise as included as part of the circumstances associated with the likelihood that the provider will contact the enterprise of the provider network.

27. The system of claim 24, wherein the remedial action includes providing information describing the circumstances associated with the likelihood that the provider will contact the enterprise of the provider network to a contact representative of the enterprise of the provider network.

28. The system of claim 24, wherein the remedial action includes instructing a contact representative of the enterprise of the provider network to contact the provider irrespective of the provider actually contacting the enterprise of the provider network.

29. The system of claim 16, wherein the additional context information is related to the provider provisioning the one or more products in response to actual performance of the one or more remedial actions.

30. A non-transitory computer-readable storage medium having stored therein instructions which, when executed by one or more processors, cause the one or more processors to:
identify a provider in a provider network associated with provisioning a specific product to a specific user;
access context information related to the provider provisioning one or more products in relation to one or more workflows for provisioning the one or more products through the provider network;
process the context information using a trained machine learning model, wherein the trained machine learning model generates an output comprising circumstances associated with a likelihood that the provider will contact an enterprise of the provider network with respect to provisioning of the specific product to the specific user;
facilitate, based on the circumstances associated with the likelihood that the provider will contact the enterprise of the provider network, performance of one or more remedial actions through the enterprise to address the provider contacting the enterprise; and
update training of the trained machine learning model using the context information, the output of the trained machine learning model, and additional context information associated with a response to the one or more remedial actions.

* * * * *